United States Patent
Tsai et al.

(10) Patent No.: US 9,723,681 B2
(45) Date of Patent: Aug. 1, 2017

(54) LED LAMP SYSTEM WITH DIFFERENT COLOR TEMPERATURES AND VARIOUS OPERATION MODES

(71) Applicants: Hsiao Chang Tsai, Taipei (TW); Xiao Bing Tu, Taipei (TW)

(72) Inventors: Hsiao Chang Tsai, Taipei (TW); Xiao Bing Tu, Taipei (TW)

(*) Notice: Subject to any disclaimer, the term of this patent is extended or adjusted under 35 U.S.C. 154(b) by 159 days.

(21) Appl. No.: 14/464,711

(22) Filed: Aug. 21, 2014

(65) Prior Publication Data

US 2016/0057818 A1   Feb. 25, 2016

(51) Int. Cl.
| H05B 33/00 | (2006.01) |
| H05B 33/08 | (2006.01) |
| H05B 37/02 | (2006.01) |

(52) U.S. Cl.
CPC ....... *H05B 33/086* (2013.01); *H05B 33/0827* (2013.01); *H05B 33/0872* (2013.01); *H05B 37/0218* (2013.01); *H05B 37/0227* (2013.01); *Y02B 20/341* (2013.01); *Y02B 20/40* (2013.01); *Y02B 20/46* (2013.01)

(58) Field of Classification Search
None
See application file for complete search history.

(56) References Cited

U.S. PATENT DOCUMENTS

| 8,256,935 B1* | 9/2012 | Cullimore | F21S 6/001 362/276 |
| 2010/0213853 A1* | 8/2010 | Tobler | H05B 33/0803 315/113 |
| 2010/0264834 A1* | 10/2010 | Gaines | H05B 33/083 315/152 |
| 2011/0148319 A1* | 6/2011 | Terazawa | H02M 3/33507 315/291 |
| 2012/0133286 A1* | 5/2012 | Uhara | H05B 33/0851 315/122 |
| 2012/0200230 A1* | 8/2012 | Esaki | H05B 33/0851 315/200 R |
| 2012/0327663 A1* | 12/2012 | Doan | F21V 9/08 362/294 |
| 2014/0300274 A1* | 10/2014 | Acatrinei | H05B 33/0815 315/85 |
| 2014/0327363 A1* | 11/2014 | Tehrani Nejad | H05B 33/0854 315/152 |

* cited by examiner

Primary Examiner — Charlie Y Peng

(57) ABSTRACT

An LED lamp system with different color temperatures and various operation modes can resolve the problems occurred in the prior arts. By switching the AC current continuously, not only the LED lamp sets can emit lights of different color temperatures, and moreover, at the same time, the light sensitive detector and moving object detection circuit serve to detect environmental light intensity and the moving objects so as to auto-control the lighting and light intensity of the LED lamp sets so as to match the requirements of environment protection and power saving As a result, intellectual light control for LED lamps is achieved. This is beneficial to the applications of LED lamps.

6 Claims, 5 Drawing Sheets

LED LAMP SYSTEM WITH DIFFERENT COLOR TEMPERATURES AND VARIOUS OPERATION MODES

FIELD OF THE INVENTION

The present invention relates to the LED lighting and control; and in particular to an LED lamp system with different color temperatures and various operation modes and the method for using the same.

BACKGROUND OF THE INVENTION

LED lamps are a kind of new lamps which have high illumination and long lifetime with low power consumption so that LED lamps are widely used currently and the functions thereof are expanded greatly, for example, using a moving object detection switch to control the lighting of the LED lamps. Currently market selling LED lamps mainly includes three different kinds, one emitting warm light with color temperatures between 2700K-3000K; another emitting warm white light with color temperatures between 4000K-5500K; and the other emitting cool white light with color temperatures between 5500K-6500K. However, in current design, the moving object detection circuit is separated from the LED lamps and the structure thereof is too complicated to be difficult in installation with low sensitivity and high installation time. In the prior art, the lighting of the LED lamp is only controlled by the moving object detection circuit, while it is inconvenient to users and thus the using of LED lamps is confined and not widely used in many markets. In many fields, it is desired to use the moving object detecting LED lamps as a general used lamp, while the above mentioned LED lamps are not suitable for this object.

Moreover, currently, one LED lamp only emits light of one color temperature. If it is desired to emit lights of three color temperatures, it needs to have three LED lamps with different color temperatures. Each LED lamp needs a set of heat dissipating base, an insulated sleeve, a set of LED dies, a heat dissipation casing, a transparent lampshade, a driving power source, a moving object detection circuit, a signal amplifier, a light sensitive detector, a lens set, a set of connecting wires and retaining screws, and heat conductive glue, etc. Thus vast of material and elements are wasted. Furthermore manufacturing time and labors are increased and further it is not suitable for the requirement of environmental protection.

SUMMARY OF THE INVENTION

Accordingly, the object of the present invention is to provide an LED lamp system with different color temperatures and various operation modes, which can resolve the problems occurred in the prior arts. By switching the AC current continuously, not only the LED lamp sets can emit lights of different color temperatures, and moreover, at the same time, the light sensitive detector and moving object detection circuit serve to detect environmental light intensity and the moving objects so as to auto-control the lighting and light intensity of the LED lamp sets so as to match the requirements of environment protection and power saving As a result, intellectual light control for LED lamps is achieved. This is beneficial to the applications of LED lamps.

To achieve above mentioned objects, the present invention provides an LED lamp system with different color temperatures and various operation modes, comprising: a power source being an AC power source; a wave generator being connected to the AC power source for generating driving signals with pre-determinant waveforms based on the switching actions from the AC power source; a driving circuit connected to the AC power source for converting the power from the AC power source into analog signals and voltage steadiness so as to provide power; a first LED lamp set receiving power from the driving circuit as a driving power; a second LED lamp set receiving power from the driving circuit for driving itself; the color temperature of the second LED lamp set being different from that of the first LED lamp set; a microprocessor receiving power from the driving circuit as driving power thereof and receiving signals from the wave generator as driving signals; a first switching circuit connected to the first LED lamp set for actuating or de-actuating the LED lamp set so as to light up or distinguish the first LED lamp set; the first switching circuit being connected to the microprocessor and receiving the signals from the microprocessor for operating the first LED lamp set; furthermore, the first switching circuit also controlling current flowing through the first LED lamp set and thus controls the illumination of the first LED lamp set; and a second switching circuit connected to the second LED lamp set for actuating or de-actuating the LED lamp set so as to light up or distinguish the second LED lamp set; the second switching circuit being connected to the microprocessor and receiving the signals from the microprocessor for operating the second LED lamp set; furthermore, the second switching circuit also controlling current flowing through the second LED lamp set and thus controlling the illumination of the second LED lamp set.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
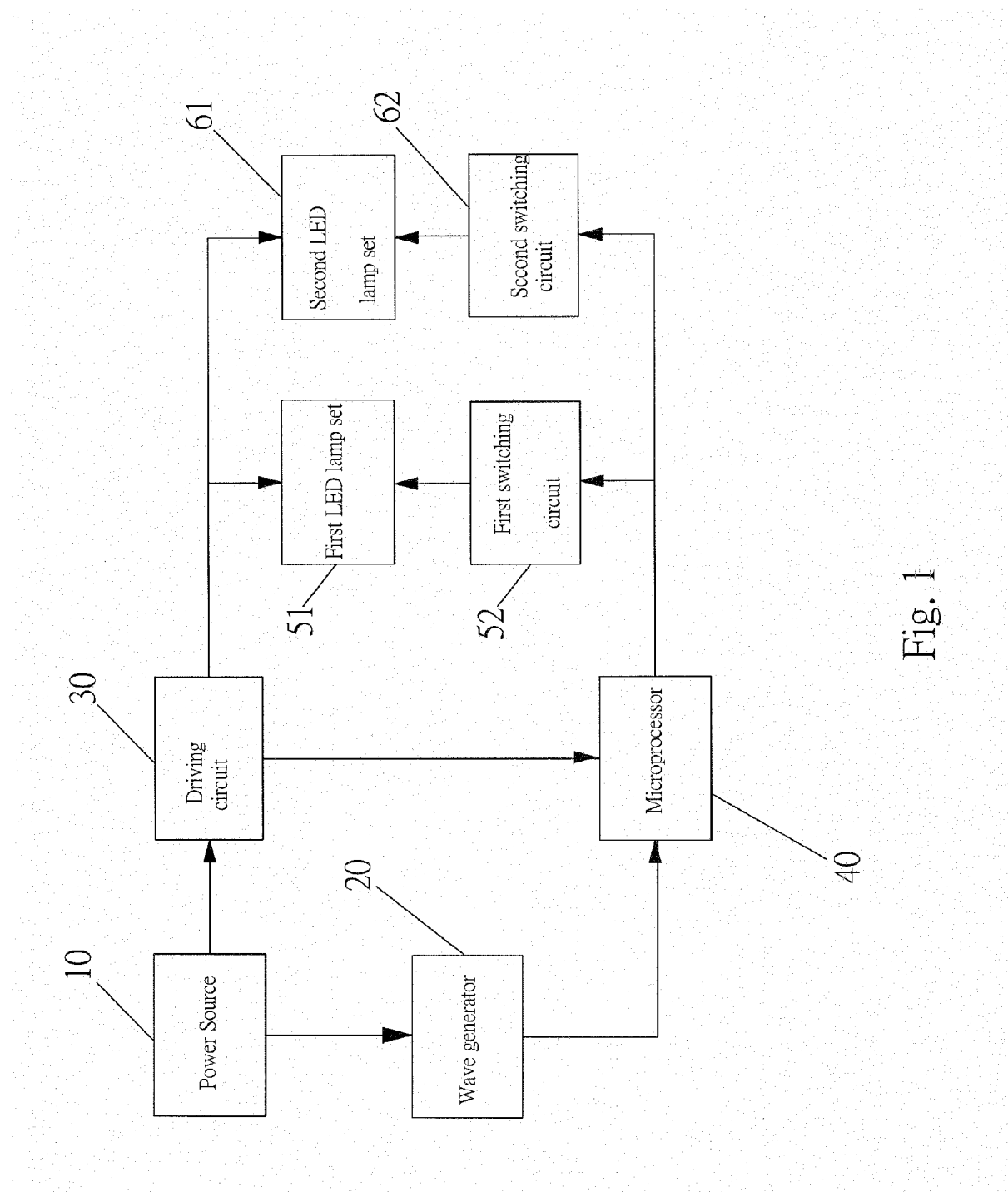
FIG. 1 is a block diagram showing the LED illumination circuit according to the present invention.

With reference to FIG. 1, the structure of the present invention is illustrated. In the present invention, the lamp set may be various kinds of lamps, such as bulbs, cylindrical lamps, plane lamps, ceiling lamps, flush-mounted ceiling lamps, oil lamps, mine lights, lights for LEDs or LCDs, fluorescent lights, PAR lamps, etc. The shapes thereof are changeable with the requirements in the design of the lamps. However, the present invention is especially suitable for LED lamps. The elements of the present invention will be described herein.

A power source 10 is an alternative current (AC) power source.

A wave generator 20 is connected to the AC power source 10 for generating driving signals with pre-determinant waveforms based on the switching actions from the power source 10. The waveforms may be digital signal waveforms.

A driving circuit 30 is connected to the power source for converting the power from the power source into analog signals and voltage steadiness so as to provide power to other elements.

A first LED lamp set 51 receives power from the driving circuit 30 as a driving power itself.

A second LED lamp set 61 receives power from the driving circuit 30 for driving itself. The color temperature of the second LED lamp set 61 is different from that of the first LED lamp set 51. For example, the color temperature of the first LED lamp set 51 is white light (presenting white color) and the color temperature of the second LED lamp set 61 is warm light (presenting yellow color).

A microprocessor 40 receives power from the driving circuit 30 as driving power thereof and receives signals from the wave generator 20 as driving signals.

A first switching circuit 52 is connected to the first LED lamp set 51 for actuating or de-actuating the LED lamp set 51 so as to light up or distinguish the first LED lamp set 51. The first switching circuit 52 is connected to the microprocessor 40 and receives the signals from the microprocessor 40 for operating the first LED lamp set 51. Furthermore, the first switching circuit 52 also controls current flowing through the first LED lamp set 51 and thus controls the illumination of the first LED lamp set 51.

A second switching circuit 62 is connected to the second LED lamp set 61 for actuating or de-actuating the LED lamp set 61 so as to light up or distinguish the second LED lamp set 61. The second switching circuit 62 is connected to the microprocessor 40 and receives the signals from the microprocessor 40 for operating the second LED lamp set 61. Furthermore, the second switching circuit 62 also controls current flowing through the second LED lamp set 61 and thus controls the illumination of the second LED lamp set 61.

There are two operation modes used in the present invention.

Manual Operation Mode 401

Figure 2:
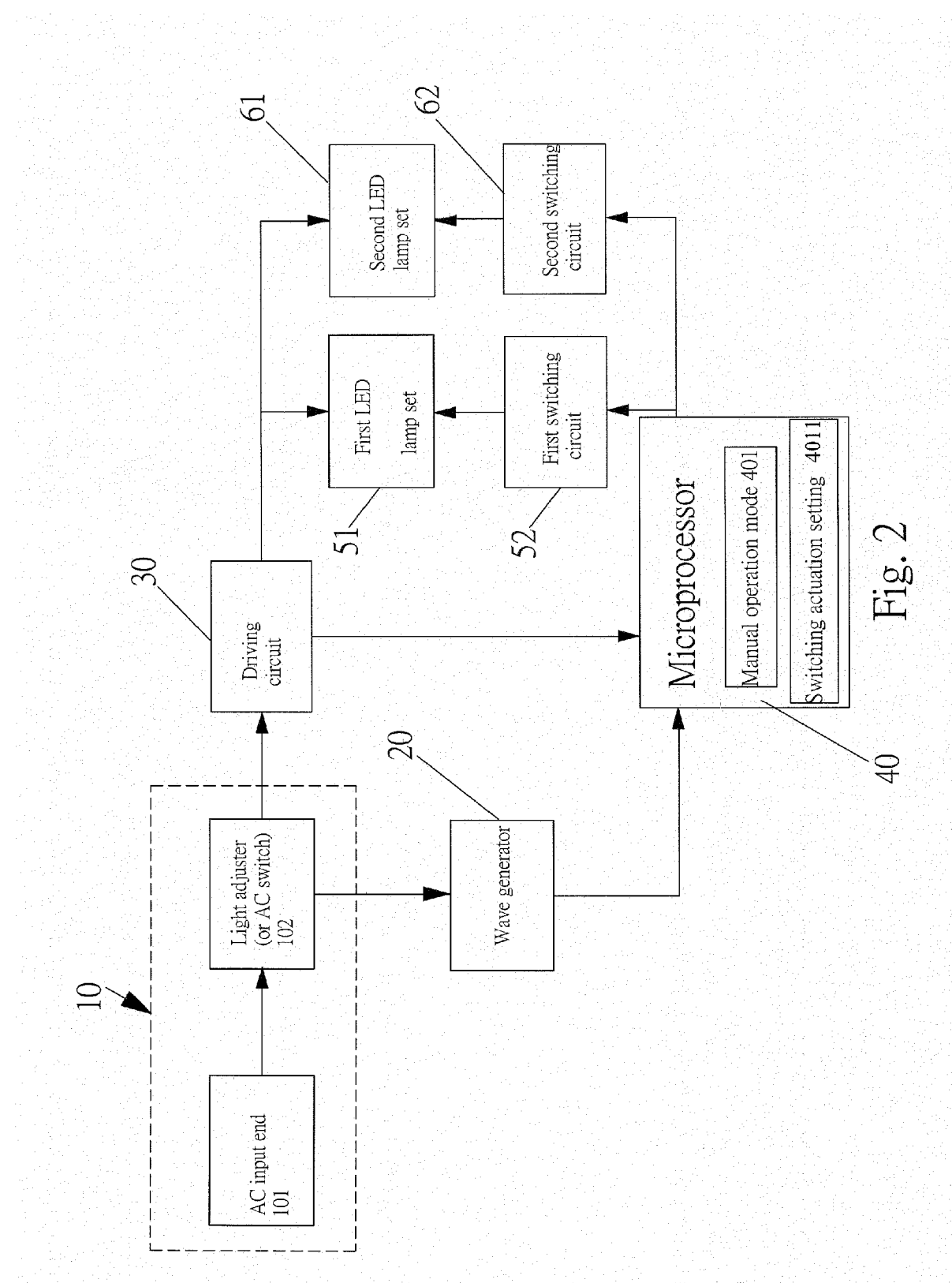
FIG. 2 shows the structure in FIG. 1, while the manual operation mode of the present invention are illustrated.

As illustrated in FIG. 2, in this mode, the user operates the power source 10 to set the system of the present invention in the manual operation mode 401. A light adjuster is installed between the driving circuit 30, the wave generator 20 and the microprocessor 40 for light adjusting. Then a manual setting unit 4011 in the microprocessor 40 sets the first and second LED lamp sets 51, 61 to be only received the manual operations from the user for deciding the illumination state of the first and second LED lamp set 51, 61. Then driving signals from the wave generator 20 enters into the microprocessor 40 and then the microprocessor 40 instructs the first and second switching circuit 51, 61 for actuating or de-actuating the first and second LED lamp sets 51, 61.

Sensing Operation Mode 402

Figure 3:
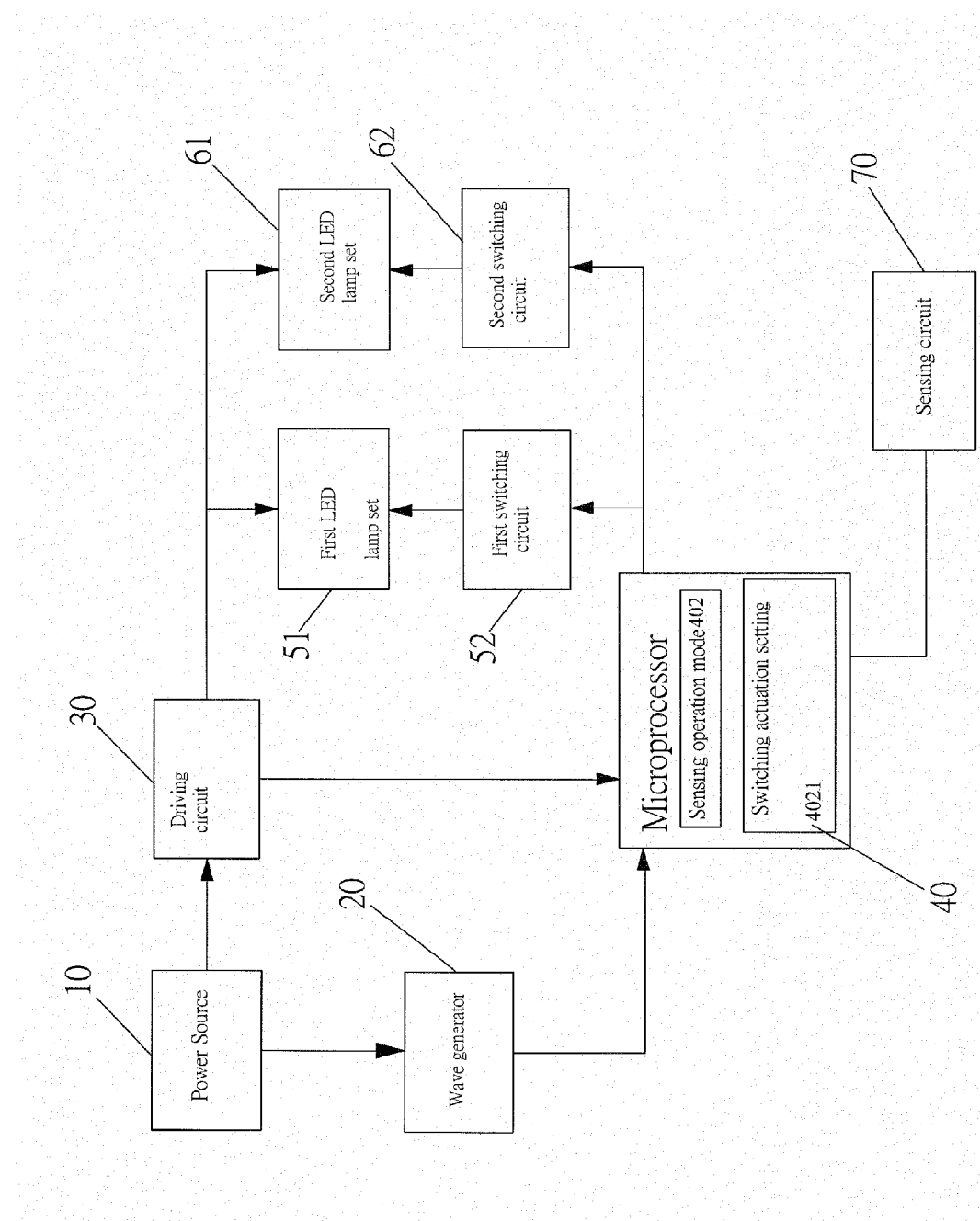
FIG. 3 shows the structure in FIG. 1, while the sensing operation mode of the present invention are illustrated.

As illustrated in FIG. 3, the user operates the power source 10 to set the system of the present invention into a sensing operation mode 402. Then a sensing setting unit 4021 in the microprocessor 40 sets the first and second LED lamp sets 51, 61 to receives the signals from the sensing circuit 70 to decide the illumination of the first and second LED lamp sets 51, 61. The driving signals from the sensing circuit 70 is transferred into the microprocessor 40 and then the microprocessor 40 controls the first and second switching circuits 52, 62 to actuate or de-actuate the first and second LED lamp sets 51, 61.

As shown in FIG. 3, in this mode, a sensing circuit 70 is connected to the microprocessor 40. The sensing circuit 70 serves to detect variations of environment illuminations and then transfers detecting signals to the microprocessor 40 to cause the microprocessor 40 to control the first and second switching circuits 51, 61 to operate the first and second LED lamp sets 51, 61.

Figure 4:
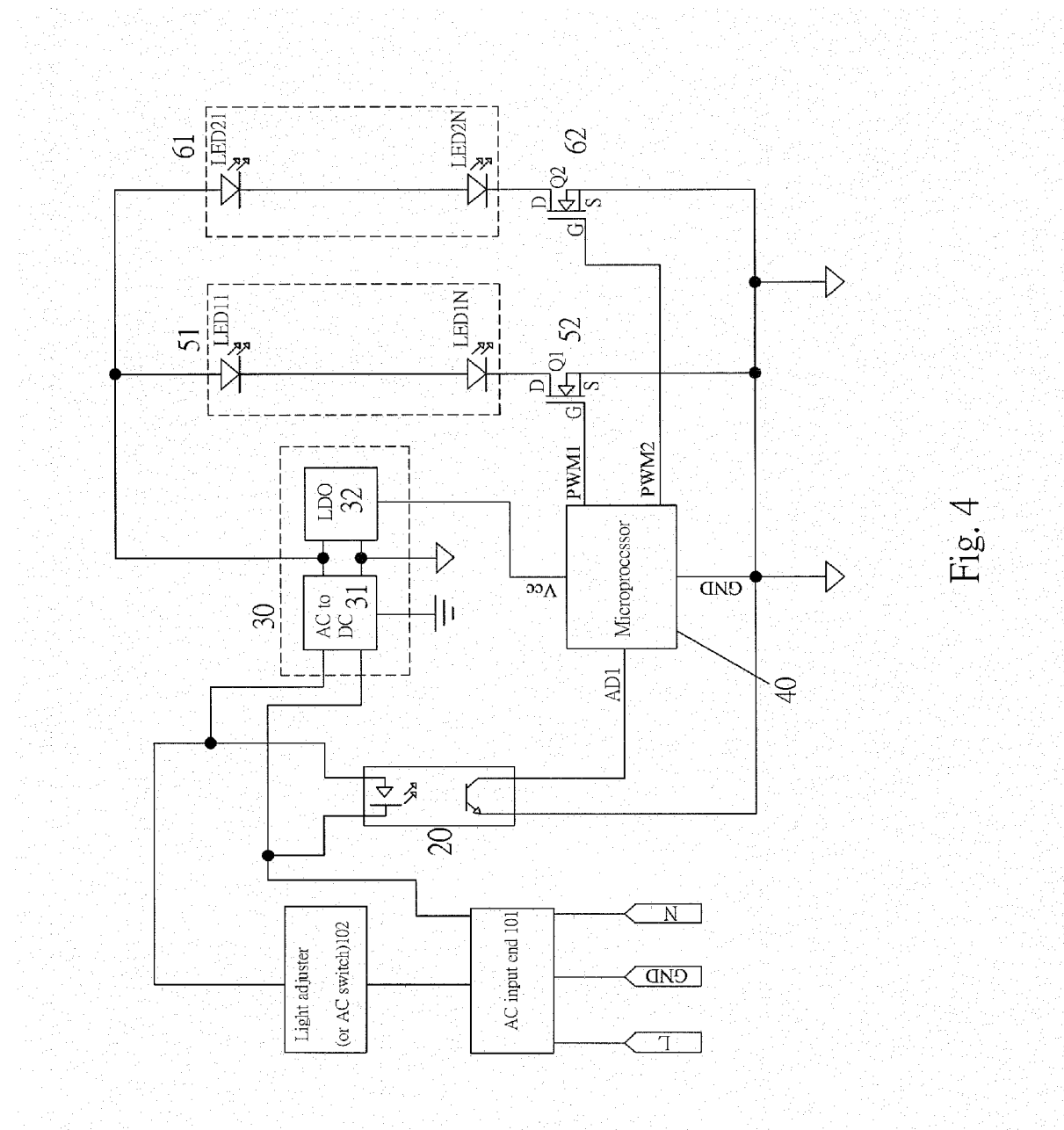
FIG. 4 is a circuit block diagram for realizing the operation mode of FIG. 2.

In the following, one circuit arrangement about the manual operation mode will be described herein. However, the following circuit is only one example for realizing the structure of the present invention, other forms which matches the block diagram in FIG. 2 are also within the scope of the present invention. With reference to FIG. 4, a circuit for realizing the structure of the present invention is illustrated. In that, an AC input end 101 (as the power source 10 in FIG. 2), a light adjuster, a driving circuit 30, an optical coupler 20 (as the wave generator 20 shown in FIG. 2), and a microprocessor 40 are shown. The AC input end 101 is connected to the light adjuster 102. The light adjuster 102 is connected to the optical coupler 20 and the driving circuit 30. The microprocessor 40 is connected to the first switching circuit 52 and then connected to the first LED lamp set 51, and also, the microprocessor 40 is connected to the second switching circuit 62 and thus connected to the second LED lamp set 61. The driving circuit 30 is connected to the microprocessor 40, the first LED lamp set 51 and the second LED lamp set 61 to supply power to them.

The driving circuit 30 includes an AC to DC circuit 31 and a voltage steady circuit 32. An output end of the voltage steady circuit 32 is connected to an output end of the AC to DC circuit 31.

The first switching circuit 51 is a field effect transistor and the second switching circuit 61 is also a field effect transistor.

Positive electrodes of the first LED lamp set 51 and the second LED lamp set 61 are connected to a positive electrode of an output end of the driving circuit 30. The negative electrodes of the first and second LED lamp sets 51, 61 are connected to the drains of the first field effect transistor 52 and the second field effect transistor 62, respectively. A source of the first field effect transistor 52 and a source of the second field effect transistor 62 are connected to a negative electrode of an output end of the driving circuit 30. A gate of the first field effect transistor 52 is connected to a first pulse width modulation signal output end of the microprocessor 40 and the gate of the second field effect transistor 62 is connected to a second pulse width modulation signal output end of the microprocessor 40.

With reference to FIG. 4, it is illustrated that the AC input end 101 includes an L line, a null line and a grounding GND. One input end of the optical coupler 20 is connected to the N line of the AC input end 101 and another end thereof is connected to the L line through the light adjuster 102. An output end of the optical coupler 20 is connected to an AD1 port of the microprocessor 40 which is as a signal input end and is an analog to digital (A to D) converting port. Output signals of the optical coupler 20 are rectangular waves which are converted into digital signals in the AD1 port. Another output end of the optical coupler 20 is connected to a negative electrode at an output end of the driving circuit 30.

The process for generating rectangular pulse in the AD1 port will be described herein. When the positive half cycle of the AC current flows through a positive electrode of the light emitting diode of the optical coupler 20, the light emitting diode of the optical coupler 20 will light up to conduct the transistor of the optical coupler 20. A voltage level of a pulse into the AD1 port is converted into a low level from a high level. When the AC current of the AC power source 10 is in a negative half cycle, the light emitting diode of the optical coupler 20 is cut off so that the light emitting diode of the optical coupler 20 does not light up and the transistor thereof does not conduct so that the pulse input the AD1 port is converted into high level from the original low level. The process is repeated continuously, as a result, rectangular waves are generated.

In this embodiment, referring to FIG. 4, the driving circuit 30 includes an AC to DC circuit 31 and a voltage regulation (LDO) circuit 32. An output end of the voltage regulation circuit 32 is connected to a voltage input end of the microprocessor 40 for providing working voltage Vcc to the microprocessor 40. The voltage regulation circuit 32 is a low difference linear voltage integrated circuit. The AC to DC circuit 31 serves to convert AC current from the AC power source 10 to DC current which is voltage and current steadily. The voltage and current are adjustable by the AC to DC circuit 31. An output end of the AC to DC circuit 31 is connected to the first and second LED lamp set 51, 61 for providing working power to the first and second LED lamp set 51, 61.

In this embodiment, each of the first LED lamp set 51 and the second LED lamp set 61 includes a plurality of serially connected LED lamps. Preferably, a number of the LED lamps in the first LED lamp set 51 is equal to that of the second LED lamp set 61. A color temperature of the LED lamps in the first LED lamp set 51 is different from that in the second LED lamp set 61.

In this embodiment, three color temperatures are selectable, which are cool white light, warm light and warm white light.

In this embodiment, the first switching circuit 52 and the second switching circuit 62 are field effect transistors which are a first field effect transistor and a second field effect transistor respectively. The drain of the first field effect transistor is connected to the negative electrode of the first LED lamp set 51; and the drain of the second field effect transistor is connected to the negative electrode of the second LED lamp set 61. The sources of the first field effect transistor and the second field effect transistor are connected to the negative electrode of the output end of the driving circuit 30. The gate of the first field effect transistor is connected to a first pulse width modulation signal output end of the microprocessor 40; and gate of the second field effect transistor is connected to a second pulse width modulation signal output end of the microprocessor 40. The first and second pulse width modulation signal output ends of the microprocessor 40 serves to provide pulse width modulation signals to the first and second field effect transistors, respectively. The continuously provisions of the pulse width modulation signals from the microprocessor 40 to the first and second switching circuits 52, 62 will cause the first and second LED lamp sets 51, 52 to light up with different color temperature, for example, the first LED lamp set 51 emits white light and the second LED lamp set 61 emits warm light (nearly yellow light) so as to present different light effects to users.

The operation of the present invention will be described herein

S100: actuating the AC power source 10 to cause the driving circuit 30 to output steady current flow to the microprocessor 40, the first LED lamp set 51 and the second LED lamp set 61;

S200: inputting rectangular waves to the microprocessor 40 from the optical coupler 20; and then the microprocessor 40 outputting pulse width modulation signals to the first switching circuit 52 to conduct the first LED lamp set 51 to cause the first LED lamp set 51 to emit cool white light; variations of pulse widths from the light adjuster 102 to the optical coupler 20 will adjust the illumination of the first LED lamp set 51.

Figure 5:
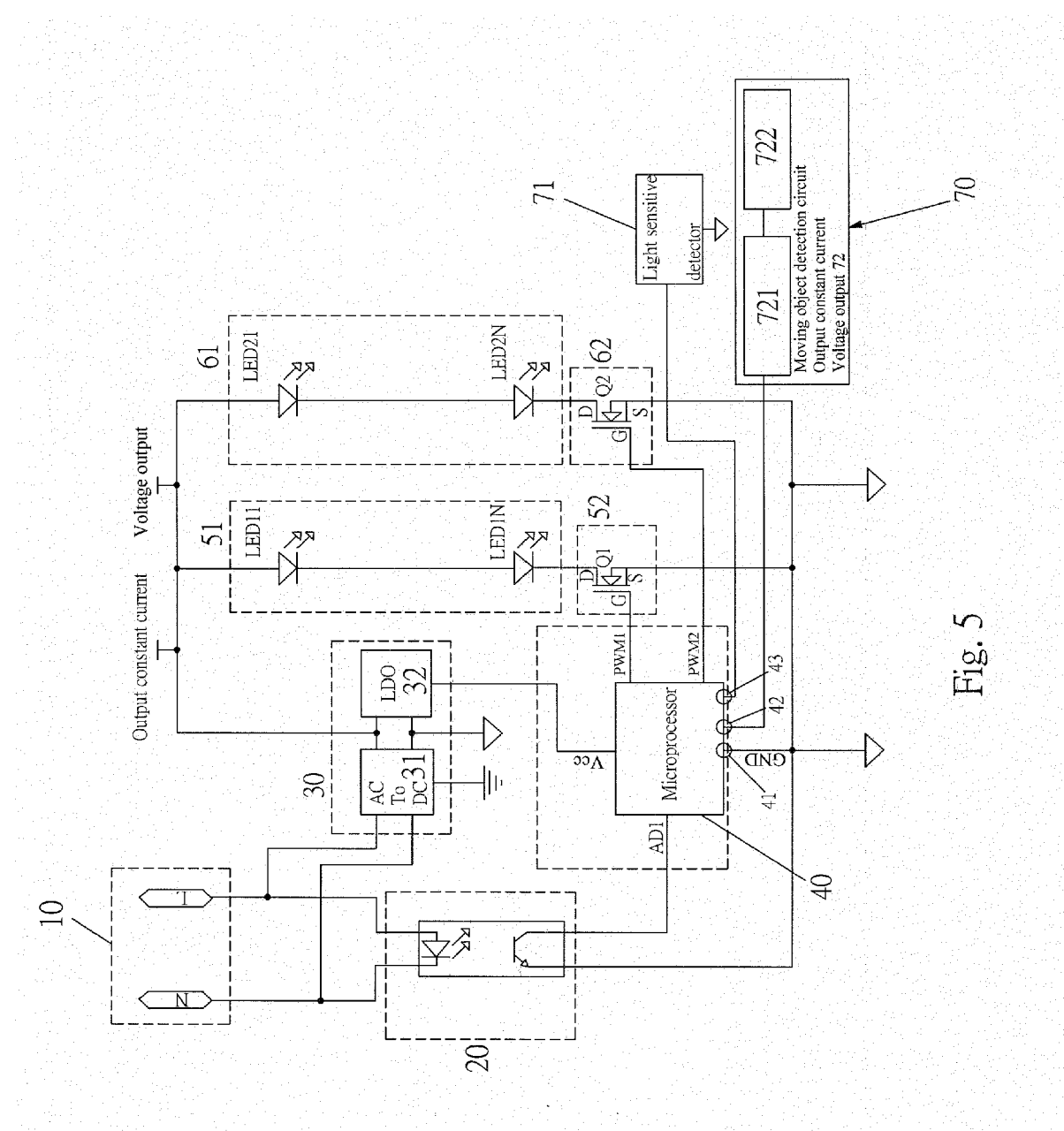
FIG. 5 is a circuit block diagram for realizing the operation mode of FIG. 3.

S300: by the light adjuster 102 to switch the AC power source 101, the input rectangular waves to the microprocessor 40 is at a low level, then the microprocessor 40 inputs pulse width modulation signals to the second switching circuit 62 to cause the second LED lamp set 61 to emit warm light. Variations of pulse widths from the light adjuster 102 to the optical coupler 20 will adjust illumination of the first LED lamp set 51;

S400: when the second LED lamp set 61 emits warm light, by the light adjuster 102 to switch the AC power source 101, the input rectangular waves to the microprocessor 40 are at low level, and the microprocessor 40 outputs half pulse width modulation signals to the first and second switching circuits 52, 62 so that the first and second LED lamp sets 51, 61 conducts simultaneously to present warm white light; variation of pulse widths from the light adjuster 102 to the optical coupler 20 will adjust the illumination of the first LED lamp sets 51, 61;

S500: when emitting warm white lights, by the light adjuster 102 to switch the AC power source 101, the input rectangular waves to the microprocessor 40 is at a low level, then the microprocessor 40 inputs pulse width modulation signals to the first switching circuit 52 to cause the first LED lamp set 51 to emit cool white light. The operation returns to the original mode and an operation circle is complete;

In the present invention, the light adjuster 102 may be replaced by an AC switch, however at this mode, the variation of pulse widths from the light adjuster 102 to the optical coupler 20 cannot be adjusted and the illumination of the first LED lamp sets 51, 61 is unadjustable;

With reference to FIG. 5, a circuit for sensing operation mode 402 (see FIG. 3) of the present invention is illustrated. In this embodiment, the elements identical to the former embodiment are illustrated by the same numerals and thus the details of these elements will not be described herein. Only those differences therebetween are described herein.

In the present invention, the sensing circuit 70 includes the following two kinds of sensors.

A moving object detection circuit 72 serves to sense moving objects passing through a detection area and then transfers detecting signals to the microprocessor 40 to cause the microprocessor 40 to control the first and second switching circuits 52, 62 to operate the first and second LED lamp sets 51, 61. The moving object detection circuit 72 includes a wireless detector 722 for detecting whether emitted wireless waves (for example, infrared light, or RF waves) is shielded. Then detection results are transferred to a signal amplifier 721 for signal amplification and then the detection result is transferred to the microprocessor 40.

In the present invention, the wireless detector may be an infrared detector and an RF detector.

A light sensitive detector 71 serves to detect environment illuminations. Different illumination will cause the light sensitive detector 71 to generate different driving signals to be transferred to the microprocessor 40.

After the microprocessor 40 receives the driving signals from the light sensitive detector 71, it determines the size of the driving current so as to determine the lighting illumination of the first and second LED lamp sets 51, 61 and then the microprocessor 40 drives the first and second switching circuits 51, 61 to cause the first and second LED lamp sets 51, 61 to light up with the determined lighting illumination.

Therefore, under the sensing operation mode 402, the system of the present invention determines whether a person moves into an illumination space of the moving object detection circuit 72. If yes, the microprocessor 40 opens the LED lamp sets. Then the light sensitive detector 71 determines an illumination for the illuminating space thereof and then the illumination is transferred to the microprocessor 40.

A second signal input end 43 of the microprocessor 40 is connected to the light sensitive detector 71. A third signal input end 42 of the microprocessor 40 is connected to the moving object detection circuit 72, especially to a signal amplifier 721 of the moving object detection circuit 72. The light sensitive detector 71 detects environmental light intensity and then outputs rectangular waves to the second signal input end 43. The moving object detection circuit 72 detects moving objects and then outputs rectangular waves to the third signal input end 42.

By above mentioned circuit, the circuit of the present invention will cause the LED lamp sets to emit different lights by the sensing circuit to sense environmental light intensity. The process of the present invention includes the following steps of:

A: actuating the AC power source 10 to cause the driving circuit 30 to output steady current flow to the microprocessor 40, the first LED lamp set 51 and the second LED lamp set 61;

B: inputting rectangular waves to the microprocessor 40 from the optical coupler 20; and then the microprocessor 40 outputting pulse width modulation signals to the first switching circuit 52 to conduct the first LED lamp set 51 to cause the first LED lamp set 51 to emit cool white light;

C: by the light adjuster 102 to switch the AC power source 101, the input rectangular waves to the microprocessor 40 is at a high level, then the microprocessor 40 inputting pulse width modulation signals to the second switching circuit 62 to cause the second LED lamp set 61 to emit warm light;

D: By the light adjuster 102 to switch the AC power source 101, the input rectangular waves to the microprocessor 40 are at a high level, and the microprocessor 40 outputs half pulse width modulation signals to the first and second switching circuits 52, 62 so that the first and second LED lamp sets 51, 61 conducts simultaneously so as to present warm white light;

In above process, the process B further comprises the following steps of:

B1: when the moving object detection circuit 72 sensing external objects, it emits a high level signal to the microprocessor 40 to cause the microprocessor 40 to output pulse width modulation signals to the first LED lamp set 51 so that the first LED lamp set 51 lights up;

The process C further comprises the following steps of:

C1: when the moving object detection circuit 72 sensing external objects, it emits a high level signal to the microprocessor 40 to cause the microprocessor 40 to output pulse width modulation signals to the second LED lamp set 61 so that the second LED lamp set 61 light up;

The process D further comprises the following steps of:

D1: when the moving object detection circuit 72 sensing external objects, it emits a high level signal to the microprocessor 40 to cause the microprocessor 40 to output half pulse width modulation signals to the first and second LED lamp sets 51 and 61 so that the first and second LED lamp sets 51, 61 light up;

Furthermore the step B further comprises the following steps of:

B2: when the light sensitive detector 71 detects that light intensity of the environment is lower than a predetermine value, the microprocessor 40 considers that it is at night and outputs a pulse width modulation signals to the first switching circuit 52 to conduct the first LED lamp set 51 so that the first LED lamp set 51 lights up;

Furthermore the step C further comprises the following steps of:

C2: when the light sensitive detector 71 detects that light intensity of the environment is lower than a predetermine value, the microprocessor 40 considers that it is at night and output a pulse width modulation signals to the second switching circuit 62 to conduct the second LED lamp set 61 so that the second LED lamp set 61 lights up;

The process D further comprises the following steps of:

D2: when the light sensitive detector 71 detects that light intensity of the environment is lower than a predetermine value, the microprocessor 40 considers that it is at night and outputs half pulse width modulation signals to the first and second LED lamp sets 51 and 61 so that the first and second LED lamp sets 51, 61 light up;

Furthermore the step D further comprises the following steps of:

E: switching the AC current so that the rectangular wave signal into the microprocessor 40 is at a high level and the microprocessor 40 outputs pulse width modulation signals to the first switching circuit 52 to conduct the first LED lamp set 51 to emit cool white light; when the moving object detection circuit 72 sensing external objects, it emits a high level signal to the microprocessor 40 to cause the microprocessor 40 to output pulse width modulation signals to the first LED lamp set 51 so that the first LED lamp set 51 light up;

In above method, when the light sensitive detector 71 detects that light intensity of the environment is lower than a predetermine value, the microprocessor 40 considers that it is at night and output a pulse width modulation signals to the first switching circuit 52 to conduct the first LED lamp set 51 so that the first LED lamp set 51 lights up;

Therefore, by switching the AC current continuously, not only the LED lamp sets can emit lights of different color temperatures, and moreover, at the same time, the light sensitive detector 71 and moving object detection circuit 72 serve to detect environmental light intensity and the moving objects so as to auto-control the lighting and light intensity of the LED lamp sets to match the requirements of environment protection and power saving As a result, intellectual light control for LED lamps is achieved. This is beneficial to the applications of LED lamps.

In the present invention, the lamp set may be various kinds of lamps, such as bulbs, cylindrical lamps, plane lamps, ceiling lamps, flush-mounted ceiling lamps, oil lamps, mine lights, lights for LCDs, fluorescent lights, PAR lamps, etc. The shapes thereof are changeable with the requirements in the design of the lamps. The power of the power source 10 is adjustable for matching the requirements of the lamps.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An LED lamp system with different color temperatures and various operation modes, comprising:
a power source being an AC power source;
a wave generator being connected to the AC power source for generating driving signals with pre-determinant waveforms based on the switching actions from the AC power source;
a driving circuit connected to the AC power source for converting the power from the AC power source into analog signals and voltage steadiness so as to provide power;
a first LED lamp set receiving power from the driving circuit as a driving power;
a second LED lamp set receiving power from the driving circuit for driving itself; the color temperature of the second LED lamp set being different from that of the first LED lamp set;
a microprocessor receiving power from the driving circuit as driving power thereof and receiving signals from the wave generator as driving signals;
a first switching circuit connected to the first LED lamp set for actuating or de-actuating the LED lamp set so as to light up or distinguish the first LED lamp set; the first switching circuit being connected to the microprocessor and receiving the signals from the microprocessor for operating the first LED lamp set; furthermore, the first switching circuit also controlling current flowing through the first LED lamp set and thus controls the illumination of the first LED lamp set; and
a second switching circuit connected to the second LED lamp set for actuating or de-actuating the LED lamp set so as to light up or distinguish the second LED lamp set; the second switching circuit being connected to the microprocessor and receiving the signals from the microprocessor for operating the second LED lamp set; and furthermore, the second switching circuit also controlling current flowing through the second LED lamp set and thus controlling the illumination of the second LED lamp set; and
wherein in a manual operation mode, a light adjuster is installed between the driving circuit, and the wave generator for light adjusting; a manual setting unit in the microprocessor sets the first and second LED lamp sets to be only received the manual operations from the user for deciding the illumination state of the first and second LED lamp set; then driving signals from the wave generator enter into the microprocessor and then the microprocessor instructs the first and second switching circuit for actuating or de-actuating the first and second LED lamp sets;
wherein the AC power source is used as an AC input end, and the wave generator is an optical coupler; the driving circuit includes an AC to DC circuit and a voltage steady circuit; and an output end of the voltage steady circuit is connected to an output end of the AC to DC circuit; the first and second switching circuits are field effect transistors, which are a first field effect transistor and a second field effect transistor, respectively;
wherein positive electrodes of the first LED lamp set and the second LED lamp set are connected to a positive electrode of an output end of the driving circuit; the negative electrodes of the first and second LED lamp sets are connected to the drains of the first field effect transistor and the second field effect transistor, respectively; a source of the first field effect transistor and a source of the second field effect transistor are connected to a negative electrode of an output end of the driving circuit; and a gate of the first field effect transistor is connected to a first pulse width modulation signal output end of the microprocessor and a gate of the second field effect transistor is connected to a second pulse width modulation signal output end of the microprocessor;
the AC input end includes an L line, a null line and a grounding GND; one input end of the optical coupler is connected to the null line of the AC input end and another end thereof is connected to the L line through the light adjuster; an output end of the optical coupler is connected to an AD1 port of the microprocessor which is as a signal input end and is an analog to digital converting port; output signals of the optical coupler are rectangular waves which are converted into digital signals in the AD1 port; and another output end of the optical coupler is connected to a negative electrode at an output end of the driving circuit;
wherein when the positive half cycle of the AC current flows through a positive electrode of a light emitting diode of the optical coupler, the light emitting diode of the optical coupler will light up to conduct a transistor of the optical coupler; a voltage level of a pulse into the AD1 port is converted into a low level from a high level, when the AC current of the AC power source is in a negative half cycle, the light emitting diode of the optical coupler is cut off so that the light emitting diode of the optical coupler does not light up and the transistor thereof does not conduct so that the pulse input the AD1 port is converted into high level from the original low level; the process is repeated continuously, as a result, rectangular waves are generated; and
wherein an output end of a voltage regulation circuit is connected to a voltage input end of the microprocessor for providing working voltage to the microprocessor; the voltage regulation circuit is a low difference linear voltage integrated circuit; the AC to DC circuit serves to convert AC current from the AC power source to DC current which is voltage and current steady; the voltage and current are adjustable by the AC to DC circuit; and an output end of the AC to DC circuit is connected to the first and second LED lamp set for providing working power to the first and second LED lamp set.

2. The LED lamp system with different color temperatures and various operation modes as claimed in claim 1, wherein each of the first LED lamp set and the second LED lamp set includes a plurality of serially connected LED lamps.

3. The LED lamp system with different color temperatures and various operation modes as claimed in claim 1, wherein three color temperatures are selectable, which are cool white light, warm light and warm white light.

4. The LED lamp system with different color temperatures and various operation modes as claimed in claim 1, wherein in the manual operation mode, the AC power source is actuated to cause the driving circuit to output steady current flow to the microprocessor, the first LED lamp set and the second LED lamp set;
then the wave generator inputting rectangular waves to the microprocessor from the optical coupler; and then the microprocessor 40 outputs pulse width modulation signals to the first switching circuit to conduct the first LED lamp set to cause the first LED lamp set to emit cool white light; variations of pulse widths from the light adjuster to the optical coupler will adjust the illumination of the first LED lamp set;

then, by the light adjuster to switch the AC power source, the input rectangular waves to the microprocessor is at the low level thereof, then the microprocessor inputs pulse width modulation signals to the second switching circuit to cause the second LED lamp set to emit warm light; variations of pulse widths from the light adjuster to the optical coupler will adjust illumination of the first LED lamp set;

when the second LED lamp set emits warm light, by the light adjuster to switch the AC power source, the input rectangular waves to the microprocessor are at low level, and the microprocessor outputs pulse width modulation signals with reduce time period to only one half; and then the signal is transferred to the first and second switching circuits so that the first and second LED lamp sets conducts simultaneously to present warm white light; variation of pulse widths from the light adjuster to the optical coupler will adjust the illumination of the first LED lamp sets; and in emitting warm white lights, by the light adjuster to switch the AC power source, the input rectangular waves to the microprocessor is at a low level, then the microprocessor inputs pulse width modulation signals to the first switching circuit to cause the first LED lamp set to emit cool white light; the operation returns to the original mode and an operation circle is complete.

5. The LED lamp system with different color temperatures and various operation modes as claimed in claim 1, wherein the light adjuster is replaced by an AC switch.

6. An LED lamp system with different color temperatures and various operation modes, comprising:
a power source being an AC power source;
a wave generator being connected to the AC power source for generating driving signals with pre-determinant waveforms based on the switching actions from the AC power source;
a driving circuit connected to the AC power source for converting the power from the AC power source into analog signals and voltage steadiness so as to provide power;
a first LED lamp set receiving power from the driving circuit as a driving power;
a second LED lamp set receiving power from the driving circuit for driving itself; the color temperature of the second LED lamp set being different from that of the first LED lamp set;
a microprocessor receiving power from the driving circuit as driving power thereof and receiving signals from the wave generator as driving signals;
a first switching circuit connected to the first LED lamp set for actuating or de-actuating the LED lamp set so as to light up or distinguish the first LED lamp set; the first switching circuit being connected to the microprocessor and receiving the signals from the microprocessor for operating the first LED lamp set; furthermore, the first switching circuit also controlling current flowing through the first LED lamp set and thus controls the illumination of the first LED lamp set; and
a second switching circuit connected to the second LED lamp set for actuating or de-actuating the LED lamp set so as to light up or distinguish the second LED lamp set; the second switching circuit being connected to the microprocessor and receiving the signals from the microprocessor for operating the second LED lamp set; furthermore, the second switching circuit also controlling current flowing through the second LED lamp set and thus controlling the illumination of the second LED lamp set;

LED lamp system with different color temperatures and various operation modes as claimed in claim 1, wherein in a sensing operation mode, a user operates the power source to set the system into a sensing operation mode; then a sensing setting unit in the microprocessor sets the first and second LED lamp sets to receives the signals from the sensing circuit to decide the illumination of the first and second LED lamp sets; the driving signals from the sensing circuit is transferred into the microprocessor and then the microprocessor controls the first and second switching circuits to actuate or de-actuate the first and second LED lamp sets; and wherein the AC power source is used as an AC input end, and the wave generator is an optical coupler; the driving circuit is an AC to DC circuit and a voltage steady circuit; and an output end of the voltage steady circuit is connected to an output end of the AC to DC circuit; the first and second switching circuit 51 are field effect transistors, which are a first field effect transistor and a second field effect transistor, respectively; and wherein positive electrodes of the first LED lamp set and the second LED lamp set are connected to a positive electrode of an output end of the driving circuit; the negative electrodes of the first and second LED lamp sets are connected to the drains of the first field effect transistor and the second field effect transistor, respectively; a source of the first field effect transistor and a source of the second field effect transistor are connected to a negative electrode of an output end of the driving circuit; and a gate of the first field effect transistor is connected to a first pulse width modulation signal output end of the microprocessor and a gate of the second field effect transistor is connected to a second pulse width modulation signal output end of the microprocessor; and the AC source includes an L line, and a null line; one input end of the optical coupler is connected to the N line of the AC input end and another end thereof is connected to the L line; an output end of the optical coupler is connected to an AD1 port of the microprocessor which is as a signal input end and is an analog to digital (A to D) converting port; output signals of the optical coupler are rectangular waves which are converted into digital signals in the AD1 port; and another output end of the optical coupler is connected to a negative electrode at an output end of the driving circuit; and wherein when the positive half cycle of the AC current flows through a positive electrode of the light emitting diode of the optical coupler, the light emitting diode of the optical coupler will light up to conduct the transistor of the optical coupler; a voltage level of a pulse into the AD1 port is converted into a low level from a high level; when the AC current of the AC power source is in a negative half cycle, the light emitting diode of the optical coupler is cut off so that the light emitting diode of the optical coupler does not light up and the transistor thereof does not conduct so that the pulse input the AD1 port is converted into high level from the original low level; the process is repeated continuously, as a result, rectangular waves are generated;

wherein an output end of the voltage regulation circuit is connected to a voltage input end of the microprocessor for providing working voltage to the microprocessor;

the voltage regulation circuit is a low difference linear voltage integrated circuit; the AC to DC circuit serves to convert AC current from the AC power source to DC current which is voltage and current steady; the voltage and current are adjustable by the AC to DC circuit; and an output end of the AC to DC circuit is connected to the first and second LED lamp set for providing working power to the first and second LED lamp set; and wherein the sensing circuit includes:

a moving object detection circuit for sensing moving objects passing through a detection area and then transferring detecting signals to the microprocessor to cause the microprocessor to control the first and second switching circuits to operate the first and second LED lamp sets; and the moving object detection circuit including a wireless detector; then detection results being transferred to a signal amplifier for signal amplification and then the detection result is transferred to the microprocessor; and a light sensitive detector for detecting environment illuminations; different illumination will cause the light sensitive detector to generate different driving signals to be transferred to the microprocessor; after the microprocessor receiving the driving signals from the light sensitive detector, it determines the size of the driving current so as to determine the lighting illumination of the first and second LED lamp sets and then the microprocessor driving the first and second switching circuits to cause the first and second LED lamp sets to light up with the determined lighting illumination.

* * * * *